(12) United States Patent
Liu

(10) Patent No.: US 12,432,291 B2
(45) Date of Patent: Sep. 30, 2025

(54) TRANSMISSION STRUCTURE AND ELECTRONIC DEVICE

(71) Applicant: VIVO MOBILE COMMUNICATION CO., LTD., Guangdong (CN)

(72) Inventor: Bang Liu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 458 days.

(21) Appl. No.: 18/068,890

(22) Filed: Dec. 20, 2022

(65) Prior Publication Data

US 2023/0127253 A1 Apr. 27, 2023

Related U.S. Application Data

(63) Continuation of application No. PCT/CN2021/102045, filed on Jun. 24, 2021.

(30) Foreign Application Priority Data

Jun. 29, 2020 (CN) ......................... 202010609492.X

(51) Int. Cl.
*H04M 1/02* (2006.01)
*H04N 23/57* (2023.01)

(52) U.S. Cl.
CPC .......... *H04M 1/0264* (2013.01); *H04N 23/57* (2023.01)

(58) Field of Classification Search
None
See application file for complete search history.

(56) References Cited

U.S. PATENT DOCUMENTS

2003/0174240 A1 9/2003 Wada et al.
2020/0374432 A1* 11/2020 Cho ........................ G06F 21/31
2020/0401361 A1* 12/2020 Han ...................... G06F 3/0482
(Continued)

FOREIGN PATENT DOCUMENTS

CN 207530918 U 6/2018
CN 108989500 A 12/2018
(Continued)

OTHER PUBLICATIONS

Translation of CN109922245A Author: Guo et al. (Year: 2019).*
(Continued)

*Primary Examiner* — Twyler L Haskins
*Assistant Examiner* — Wesley J Chiu
(74) *Attorney, Agent, or Firm* — BROOKS KUSHMAN P.C.

(57) ABSTRACT

A transmission structure and an electronic device, where the transmission structure includes: a driving member, a transmission assembly, a camera module, and a functional module, where the driving member is connected to the camera module, and the camera module is connected to the functional module through the transmission assembly, where the camera module includes at least one camera, and the functional module includes a first functional component and a second functional component arranged along a first direction; and in a case that the driving member drives the camera module to move along a second direction, the transmission assembly drives the functional module to move along the first direction, and an angle between the first direction and the second direction is greater than 0°.

14 Claims, 2 Drawing Sheets

(56) References Cited

U.S. PATENT DOCUMENTS

| | | | |
|---|---|---|---|
| 2023/0123474 A1* | 4/2023 | Ding | H04N 23/54 |
| | | | 348/374 |
| 2023/0156312 A1* | 5/2023 | Liu | H04M 1/0235 |
| | | | 348/333.04 |

FOREIGN PATENT DOCUMENTS

| | | | | |
|---|---|---|---|---|
| CN | 109922245 A | * | 6/2019 | |
| CN | 110099147 A | | 8/2019 | |
| CN | 108600464 A | | 9/2019 | |
| CN | 110430295 A | | 11/2019 | |
| CN | 110445914 A | * | 11/2019 | H04M 1/0266 |
| CN | 110519494 A | | 11/2019 | |
| CN | 110557541 A | * | 12/2019 | G06F 1/1686 |
| CN | 110650229 A | * | 1/2020 | H04M 1/0264 |
| CN | 210041899 U | | 2/2020 | |
| CN | 111294429 A | | 6/2020 | |
| CN | 111477104 A | * | 7/2020 | H04N 23/695 |
| CN | 111756899 A | | 10/2020 | |
| JP | 2003259166 A | | 9/2003 | |
| KR | 20050057881 A | | 6/2005 | |
| KR | 102108650 B1 | | 5/2020 | |
| WO | 2020108274 A1 | | 6/2020 | |

OTHER PUBLICATIONS

Extended European Search Report for Application No. 21832980.3, dated Nov. 28, 2023, 10 Pages.

First Office Action for Japanese Application No. 2022-581576, dated Jan. 10, 2024, 2 Pages.

First Office Action for Chinese Application No. 202010609492.X, dated Feb. 3, 2021, 6 Pages.

International Search Report and Written Opinion for Application No. PCT/CN2021/102045, dated Sep. 13, 2021, 8 Pages.

First Office Action for Indian Application No. 202317003377, dated Apr. 23, 2024, 5 Pages.

First Office Action for Korean Application No. 10-2023-7001598, dated Jul. 8, 2024, 4 Pages.

* cited by examiner

TRANSMISSION STRUCTURE AND ELECTRONIC DEVICE

CROSS-REFERENCE TO RELATED APPLICATIONS

This application is a continuation of International Application No. PCT/CN2021/102045 filed on Jun. 24, 2021, which claims priority to Chinese Patent Application No. 202010609492.X filed on Jun. 29, 2020, which are incorporated herein by reference in their entireties.

TECHNICAL FIELD

This application relates to the field of communications technologies, and in particular to a transmission structure and an electronic device.

BACKGROUND

With the development of technologies, screen-to-body ratios of electronic devices such as mobile phones are increasingly greater. To achieve a higher screen-to-body ratio and a better appearance, an elevation-type camera has become a development trend as a feasible solution. Movement of the camera is driven by a driving mechanism, and a position of the camera can be flexibly adjusted according to user demands. However, other components of the electronic device are still disposed in fixed positions and cannot be flexibly adjusted according to use conditions of a user. In addition, the fixed components occupy outer surface space of the electronic device, which is not conducive to increase of a screen-to-body ratio.

SUMMARY

Embodiments of this application provide a transmission structure and an electronic device.

An embodiment of this application provides a transmission structure, including: a driving member, a transmission assembly, a camera module, and a functional module, where the driving member is connected to the camera module, and the camera module is connected to the functional module through the transmission assembly, where the camera module includes at least one camera, and the functional module includes a first functional component and a second functional component arranged along a first direction; and in a case that the driving member drives the camera module to move along a second direction, the transmission assembly drives the functional module to move along the first direction, and an angle between the first direction and the second direction is greater than 0°.

An embodiment of this application further provides an electronic device, including a housing and the foregoing transmission structure, where the transmission structure is located in the housing, and the housing is provided with an opening and a light transmission hole, the driving member can drive the camera module to move between a first position and a second position, and the transmission assembly drives the functional module to move between a third position and a fourth position, where in a case that the camera module is located at the first position, the functional module is located at the third position, the camera module at least partially passes through the opening and is located outside the housing, and the first functional component is opposite to the light transmission hole; and in a case that the camera module is located at the second position, the functional module is located at the fourth position, the camera module is hidden in the housing, and the second functional component is opposite to the light transmission hole.

DETAILED DESCRIPTION

Figure 1:
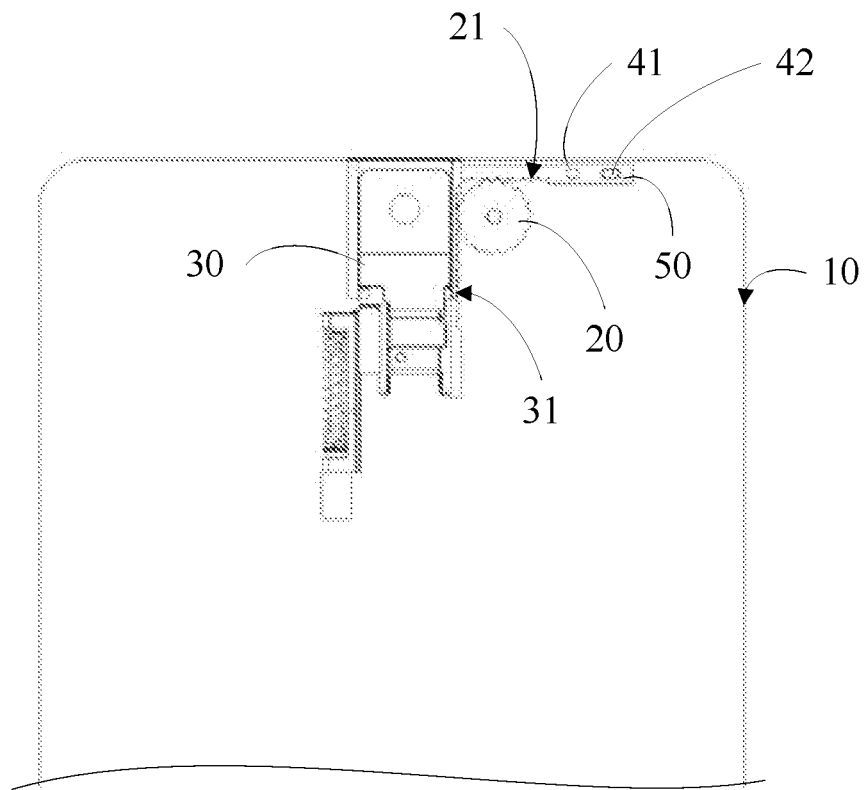
FIG. 1 is a first schematic structural diagram of an electronic device according to an embodiment of this application.

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The terms "first", "second", and the like in this specification and claims of this application are used to distinguish between similar objects instead of describing a specific order or sequence. It should be understood that the data used in this way is interchangeable in appropriate circumstances so that the embodiments of this application can be implemented in other orders than the order illustrated or described herein. In addition, "and/or" in the specification and claims represents at least one of connected objects. Symbol "/" in the specification generally represents an "or" relationship between associated objects.

As shown in FIG. 1 to FIG. 4, embodiments of this application provide an electronic device, including a housing 10 and a transmission structure, and the housing is provided with an opening (not shown) and a light transmission hole (not shown).

The transmission structure includes a driving member (not shown), a transmission assembly 20, a camera module 30, and a functional module. The driving member is connected to the camera module 30, and the camera module 30 is also connected to the functional module through the transmission assembly 20.

The camera module 30 includes at least one camera, and the functional module includes a first functional component 41 and a second functional component 42 arranged along a first direction. In a case that the driving member drives the camera module 30 to move along a second direction, the transmission assembly 20 drives the functional module to move along the first direction, and an angle between the first direction and the second direction is greater than 0°.

Under the action of the driving member, the camera module 30 can move between a first position and a second position, and the transmission assembly 20 drives the functional module to move between a third position and a fourth position.

In a case that the camera module 30 is located at the first position, the functional module is located at the third position, the camera module 30 at least partially passes through the opening and is located outside the housing 10, and the first functional component 41 is opposite to the light transmission hole. In a case that the camera module 30 is located at the second position, the functional module is located at the fourth position, the camera module 30 is hidden in the housing 10, and the second functional component 42 is opposite to the light transmission hole.

In this implementation manner, the camera module 30 and the functional module are connected through the transmission assembly 20, so that when the camera module 30 driven by the driving member moves along the second direction, the camera module can drive the transmission assembly 20 to move, further driving the functional module to move along the first direction, so as to achieve link movement of the functional module and the camera module 30. This way, movement of the functional module is driven by movement of the camera module 30, so that a fixed position for an existing functional module can be changed, to meet a user's demand for changing a position of the functional module.

By disposing the angle between the first direction and the second direction to be greater than 0°, the camera module 30 and the functional module can move along different directions, so as to meet the user's demand for position change of the functional module.

When the transmission structure is applied to the electronic device, position change of the camera module 30 causes position change of the functional module, so that a position of the functional component included in the functional module can be adjusted according to a use scenario. For example, in a case that the camera module 30 is located at the first position, the camera module 30 at least partially passes through the opening and is located outside the housing 10, the functional module is located at the third position, and the first functional component 41 of the functional module is opposite to the light transmission hole, to achieve a relevant function of the first functional component 41. In a case that the camera module 30 is located at the second position, the functional module is located at the fourth position in the housing 10 in which the camera module 30 is hidden, and the second functional component 42 of the functional module is opposite to the light transmission hole, to achieve a relevant function of the second functional component 42. With such arrangement, the first functional component 41 and the second functional component 42 share one light transmission hole, so that the number of light transmission holes opened on the housing 10 can be effectively reduced, and then a problem of a screen-to-body ratio of the electronic device is small caused by excessively many light transmission holes can be reduced, and then the screen-to-body ratio of the electronic device can be increased.

The first functional component 41 may be a flashlight, the second functional component 42 may be an optical sensor, and the second functional component 42 may also be another functional component, such as a receiver.

For example, the first functional component 41 is the flashlight, and the second functional component 42 is the optical sensor for description as follows.

When the camera module 30 is located at the first position, the camera module 30 at least partially passes through the opening and is located outside the housing 10, the functional module is located at the third position, and the flashlight is opposite to the light transmission hole, so that a light filling function of the flashlight can be achieved, shooting requirements of the camera module 30 can be satisfied, and the optical sensor can be controlled to be in a non-working state, to reduce power consumption of the electronic device.

Correspondingly, in a case that the camera module 30 is at the second position, the functional module is located at the fourth position in the housing 10 in which the camera module 30 is hidden, and the optical sensor is opposite to the light transmission hole, so as to achieve a relevant function of the optical sensor. For example, when the optical sensor is an infrared sensor, an infrared detection function of the electronic device can be achieved, and the flashlight can be controlled to be turned off, that is, in a non-working state, so as to reduce the power consumption of the electronic device.

The camera module 30 includes a camera assembly and a lifting assembly, the lifting assembly is connected to the camera assembly, the lifting assembly is also connected to the driving member, and the camera assembly is further connected to the transmission assembly 20. Under the action of the driving member, the lifting assembly drives the camera assembly to move, the camera assembly drives the transmission assembly 20 to move, and the transmission assembly 20 drives the functional module to move.

The driving member is configured to drive the camera module 30 to move between the first position and the second position, that is, to drive the camera module 30 to switch between a protruding state and a retracting state.

Optionally, the driving member may be a driving motor configured to drive the lifting assembly to move; and the lifting assembly may be a screw drive assembly configured to drive the camera assembly to move.

The light transmission hole may be a light transmission channel disposed at the housing 10 or an opening for light transmission. In this application, the light transmission hole is configured to achieve light interaction between the flashlight or the optical sensor and the outside, that is, the flashlight can emit light through the light transmission hole, and the optical sensor can emit light to the outside or receive light from the outside through the light transmission hole.

Optionally, the functional module further includes a support 50. The first functional component 41 and the second functional component 42 are disposed on the support 50. The transmission assembly 20 is connected to the support 50 and can drive the support 50 to move along the first direction.

In this implementation manner, the first functional component 41 and the second functional component 42 are disposed on the support 50 and move together with the support 50. Especially, in a case that the first functional component 41 is the flashlight, there is no need to reserve an installation position for the flashlight on the camera module 30, so that an overall volume of the camera module 30 can be reduced effectively, and then installation space required for the camera module 30 can be reduced. In addition, the first functional component 41 and the second functional component 42 share one light transmission hole, so that the number of light transmission holes opened at the housing 10 can be reduced, and a screen-to-body ratio of the electronic device can be increased to some extent.

In a case that the first functional component 41 is the flashlight and the second functional component 42 is the optical sensor, when the functional module is at the third position, that is, the flashlight is opposite to the light transmission hole and the optical sensor is hidden in the housing 10, a working state of the flashlight is controlled, to meet shooting requirements of a user, and the optical sensor is controlled to be in a non-working state, to reduce the power consumption of the electronic device. When the functional module is at the fourth position, that is, the optical sensor is opposite to the light transmission hole and the flashlight is hidden in the housing 10, the light sensor is controlled to be in a working state, to achieve infrared detection and other functions of the electronic device, and the flashlight is controlled to be off, that is, in a non-working state, to reduce the power consumption of the electronic device.

An angle between the first direction and the second direction is 90°, that is, the first direction and the second direction are perpendicular, and a movement direction of the camera module 30 is perpendicular to a movement direction of the functional module. For example, the movement direction of the camera module 30 is a length direction of the electronic device, and the movement direction of the functional module is a width direction of the electronic device.

The support 50 provided with the flashlight and the optical sensor is located in the housing 10 and can move in the housing 10, such as left and right movement.

Moreover, movement of the support 50 can be implemented through an additional driving assembly, and the drive assembly can drive the transmission component 20 to move, further driving the support 50 to move, so that the support 50 can move to the third position or the fourth position, and a relevant function of the electronic device can be achieved. Alternatively, the camera module 30 and the support 50 can be connected by the transmission assembly 20, so that the support 50 can move along with the camera module 30. For example, when the camera module 30 moves to the first position, the support 50 moves to the third position, so that the electronic device can achieve a relevant function of the first functional component 41. Correspondingly, when the camera module 20 moves to the second position, the support 50 moves to the fourth position, so that the electronic device can achieve a relevant function of the second functional component 42.

The camera module 30 and the support 50 can be connected by the transmission assembly 20, so that the support 50 can move along with the camera module 30, setting of the driving assembly can be skipped, and then space can be reduced, and layout of a functional component of the electronic device can be optimized.

Optionally, the transmission assembly 20 includes a first transmission member and a second transmission member. The first transmission member is connected to the camera module 30, the second transmission member is connected to the functional module, and the first transmission member is in transmission connection with the second transmission member.

In this implementation manner, the second transmission member is connected to the support 50 of the functional module, and since the camera module 30 can move between the first position and the second position, the support 50 can move between the third position and the fourth position correspondingly. When the camera module 30 is located at the first position, the support 50 is located at the third position, and the first functional component 41 is opposite to the light transmission hole. When the camera module 30 is located at the second position, the support 50 is located at the fourth position, and the second functional component 42 is opposite to the light transmission hole.

In a case that the first functional component 41 is the flashlight and the second functional device 42 is the optical sensor, the camera module 30 and the support 50 are connected through the transmission assembly 20, so that the support 50 can move along with the camera module 30. Therefore, synchronous movement of the flashlight and the camera module can be implemented, and then shooting experience of the electronic device can be improved. For example, when the camera module 30 is at the first position, that is, the camera module 30 is at least partially located outside the housing 10 through the opening, so that the shooting function of the camera module 30 can be achieved. Because the support 50 moves together with the camera module 30, when the camera module 30 is located at the first position, the flashlight also moves to a position facing the light transmission hole, so that a light filling function of the camera module 30 can be achieved, and then shooting experience of the electronic device can be improved.

Figure 2:
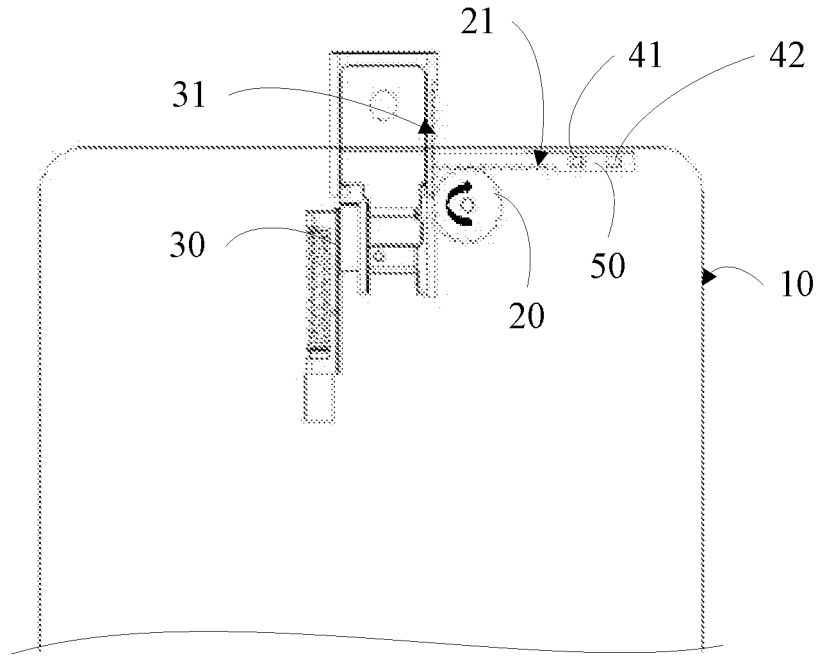
FIG. 2 is a second schematic structural diagram of the electronic device according to an embodiment of this application.

As shown in FIG. 2, a camera module 30 is provided with a first spur rack 31, a first transmission member is a first gear, and the first gear is meshed with the first spur rack 31. Therefore, when the camera module 30 telescopically moves relative to the housing 10, the first spur rack 31 can drive the first gear to rotate, so that the camera module 30 can drive a transmission assembly 20 to move.

A second transmission member is a second spur rack 21, and the second spur rack 21 is meshed with the first gear, so that the second spur rack 21 can move laterally under the action of the first gear. The second spur rack 21 is also fixedly connected to a support 50, so that the support 50 can move laterally together with the second spur rack 21, and a flashlight and an optical sensor located on the support 50 can move relative to a position of a light transmission hole. In addition, when the support 50 moves to a fourth position, the optical sensor is disposed facing the light transmission hole, and the flashlight is hidden in a housing 10. When the support 50 moves to a third position, the flashlight is disposed facing the light transmission hole, and the optical sensor is hidden in the housing 10.

The support 50 and the second spur rack 21 can be an integral structure, that is, the spur rack can be disposed on the support 50 to form the second transmission member.

It should be noted that, to facilitate movement of the support 50 in the housing 10, a sliding member slidably connected to the support 50 can also be disposed in the housing 10, and the sliding member may be a sliding rail or a sliding groove disposed in the housing 10.

When the sliding member is the sliding rail disposed in the housing 10, a sliding groove matched with the sliding rail can be disposed on the support 50. When the sliding member is the sliding groove disposed in the housing 10, a sliding rail or a sliding block matched with the sliding groove can be disposed on the support 50, so that movement of the support 50 in the housing 10 can be improved.

In this implementation manner, a transmission mode for the gear and rack is characterized with a simple structure and small space, so that installation space required for the transmission assembly 20 can be reduced effectively.

In addition, a position of the support 50 can also be switched in another transmission mode, such as a cam transmission mode or a slider-crank mechanism.

Figure 3:
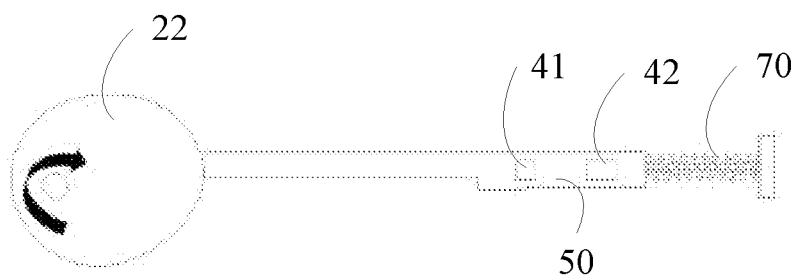
FIG. 3 is a first schematic diagram of transmission of a support according to an embodiment of this application.

As shown in FIG. 3, a second transmission member may be an eccentric wheel 22. One end of a support 50 may abut against an outer peripheral surface of the eccentric wheel 22, and the other end of the support 50 can be connected to an inner side wall of a housing 10 through an elastic member 70. The support 50 can move to a third position or a fourth position by using a characteristic of the eccentric wheel 22.

The elastic member 70 may be a spring, or a silicone tape or the like with an elastic function.

The housing 10 is provided with a first sliding member (not shown), and the support 50 can be slidably connected to the first sliding member, so that the support 50 can move to a first position or a second position.

Specifically, the first sliding member may be a first sliding rail disposed in the housing 10, and the support 50 is provided with a first sliding groove matched with the first sliding rail. Alternatively, the first sliding member may be a second sliding groove disposed on the housing 10, and the support 50 is provided with a second sliding rail matched with the second sliding groove. Therefore, movement of the support 50 in the cam transmission mode can be implemented.

It should be noted that, in this implementation manner, the first transmission member may be a gear, and can be meshed with a rack on a camera module 30. Therefore, the camera module 30 can drive the first transmission member to move. The first transmission member and the second transmission member can be coaxially disposed, so that the second transmission member can move along with the first transmission member, further driving the support 50 to move, and the support 50 can move to the third position or the fourth position, and a function corresponding to the flashlight or optical sensor of the electronic device can be achieved.

Figure 4:
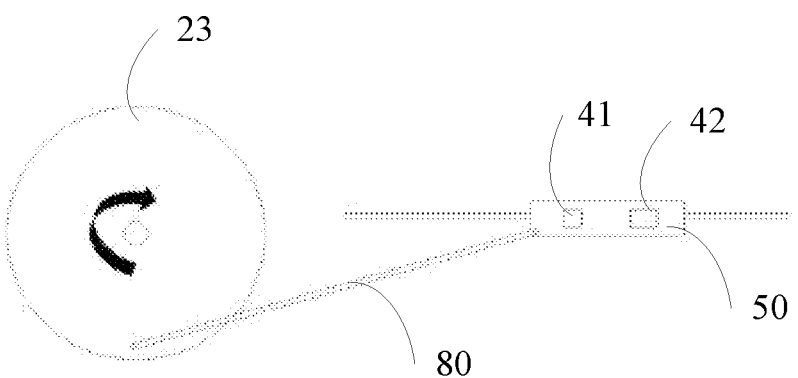
FIG. 4 is a second schematic diagram of transmission of the support according to an embodiment of this application.

As shown in FIG. 4, a second transmission member may be a rotary table 23. The rotary table 23 is connected to a support 50 through a connecting rod 80, and a housing 10 is provided with a second sliding member (not shown), and the support 50 can be slidably connected to the second sliding member. The connecting rod 80, the support 50, the rotary table 23, and the second sliding member form a slider-crank mechanism, so that the support 50 can move to a third position or fourth position, and a corresponding function can be achieved.

Specifically, the second sliding member may be a third sliding rail disposed in the housing 10, and the support 50 is provided with a third sliding groove matched with the third sliding rail. Alternatively, the second sliding member may be a fourth sliding groove disposed on the housing 10, and the support 50 is provided with a fourth sliding rail matched with the fourth sliding groove. Therefore, movement of the support 50 in a crank-link mechanism mode can be implemented.

It should be noted that, in this implementation manner, the first transmission member may be a gear, and can be meshed with a rack on a camera module 30, so that the camera module 30 can drive the first transmission member to move. The first transmission member and the second transmission member can be coaxially disposed, so that the second transmission member can move along with the first transmission member, further driving the support 50 to move, and the support 50 can move to a first position or a second position, and a function corresponding to the flashlight or optical sensor of the electronic device can be achieved.

It should be noted that the first transmission member and the second transmission member can be two transmission members disposed on a same shaft, so that the second transmission member can move along with the first transmission member.

The embodiments of this application are described above with reference to the accompanying drawings, but this application is not limited to the foregoing specific implementation manners. The foregoing specific implementation manners are merely schematic instead of restrictive. Under enlightenment of this application, a person of ordinary skills in the art may make many forms without departing from aims and the protection scope of claims of this application, all of which fall within the protection scope of this application.

The invention claimed is:

1. An electronic device, comprising a housing and a transmission structure, wherein the transmission structure is located in the housing, and the housing is provided with an opening and a light transmission hole,
    the transmission structure comprises: a driving member, a transmission assembly, a camera module, and a functional module, wherein the driving member is connected to the camera module, and the camera module is connected to the functional module through the transmission assembly,
    wherein the camera module comprises at least one camera, and the functional module comprises a first functional component and a second functional component arranged along a first direction; and in a case that the driving member drives the camera module to move along a second direction, the transmission assembly drives the functional module to move along the first direction, and an angle between the first direction and the second direction is greater than 0°;
    the driving member can drive the camera module to move between a first position and a second position, and the transmission assembly drives the functional module to move between a third position and a fourth position,
    wherein in a case that the camera module is located at the first position, the functional module is located at the third position, the camera module at least partially passes through the opening and is located outside the housing, and the first functional component is opposite to the light transmission hole; and in a case that the camera module is located at the second position, the functional module is located at the fourth position, the camera module is hidden in the housing, and the second functional component is opposite to the light transmission hole.

2. The electronic device according to claim 1, wherein the functional module further comprises a support, and the first functional component and the second functional component are disposed on the support; and
    the transmission assembly is connected to the support and can drive the support to move along the first direction.

3. The electronic device according to claim 2, wherein the transmission assembly comprises a first transmission member and a second transmission member, wherein the first transmission member is connected to the camera module, the second transmission member is connected to the functional module, and the first transmission member is in transmission connection with the second transmission member.

4. The electronic device according to claim 3, wherein the first transmission member is a first gear, the camera module is provided with a first spur rack, and the first gear is meshed with the first spur rack; and
    the second transmission member is a second spur rack, the second spur rack is fixedly connected to the support, and the first gear is further meshed with the second spur rack.

5. The electronic device according to claim 3, wherein the transmission structure further comprises a first sliding member, and the support is slidably connected to the first sliding member; and
    the second transmission member is an eccentric wheel, one end of the support abuts against an outer peripheral surface of the eccentric wheel, and the other end of the support is connected to a base through an elastic member.

6. The electronic device according to claim 3, wherein the transmission structure further comprises a second sliding member, and the support is slidably connected to the second sliding member; and the second transmission member is a rotary table, the rotary table is connected to the support through a connecting rod, and the rotary table, the connecting rod, the support, and the second sliding member form a slider-crank mechanism.

7. The electronic device according to claim 1, wherein the first functional component is a flashlight.

8. The electronic device according to claim 7, wherein the second functional component is an optical sensor.

9. The electronic device according to claim 1, wherein the angle between the first direction and the second direction is 90°.

10. The electronic device according to claim 2, wherein the angle between the first direction and the second direction is 90°.

11. The electronic device according to claim 3, wherein the angle between the first direction and the second direction is 90°.

12. The electronic device according to claim 4, wherein the angle between the first direction and the second direction is 90°.

13. The electronic device according to claim 5, wherein the angle between the first direction and the second direction is 90°.

14. The electronic device according to claim 6, wherein the angle between the first direction and the second direction is 90°.

* * * * *